United States Patent

[11] 3,617,288

[72] Inventors Richard B. Hartman
 White Bear Lake;
 George H. Smith, Maplewood, both of
 Minn.
[21] Appl. No. 857,552
[22] Filed Sept. 12, 1969
[45] Patented Nov. 2, 1971
[73] Assignee Minnesota Mining and Manufacturing Company
 Saint Paul, Minn.

[54] PROPENONE SENSITIZERS FOR THE PHOTOLYSIS OF ORGANIC HALOGEN COMPOUNDS
 8 Claims, No Drawings

[52] U.S. Cl. ................................................ 96/90, 96/88

[51] Int. Cl. .................................................. G03c 1/60, G03c 1/72
[50] Field of Search ........................................ 96/90, 88, 48, 115 P, 35.1, 73, 74, 65, 66.3, 99, 100, 1.3, 1.5

[56] References Cited
 UNITED STATES PATENTS
 3,081,165  3/1963  Ebert ............................ 96/1.3
 3,374,094  3/1968  Wainer .......................... 96/90 X

*Primary Examiner*—John T. Goolkasian
*Assistant Examiner*—M. E. McCamish
*Attorney*—Kinney, Alexander, Sell, Steldt & De La Hunt ABSTRACT: Photosensitive compositions containing nonbasic propenone compounds as sensitizers for photolyzable organic halogen compounds, and image recording elements in which at least one layer contains such photosensitive compositions.

PROPENONE SENSITIZERS FOR THE PHOTOLYSIS OF ORGANIC HALOGEN COMPOUNDS

This invention relates to a new class of sensitizers for the photolysis of organic halogen compounds. In particular this invention relates to sensitizers which extend the photolysis of organic halogen compounds to higher wavelengths of light.

Organic halogen compounds are widely used in the graphic arts field to produce commercially useful photosensitive constructions. They may be used as photoinitiators for free radical photography (e.g. printout and bleach systems), photopolymerization, and photoinduced acid catalyzed reactions of many types. Various photosensitive products useful in printing, duplicating, copying and other imaging systems can be prepared with such organic halogen compounds.

Organic halogen compounds are known to photodissociate to give free radical halogen, such as free radical bromine and chlorine, which are good hydrogen abstractors and which will produce acid in the presence of hydrogen donors. Their use in photopolymerization processes is described in *Light Sensitive Systems: Chemistry and Application of Nonsilver Halide Photographic Processes*, J. Kosar, J. Wiley & Sons (New York, 1965), pages 180–181. Both the free radical halogen and the photoproduced acid have been used in various systems involving the photochemical formation and destruction of dyes, see the above Kosar citation, pages 361–370.

The use of sensitizers to broaden the spectral response of organic halogen compounds is known, and yellow azo dyes, styryl and leuco dye bases, and cyanine dyes are suitable for this purpose. Unfortunately most of such sensitizers cause serious stability problems under normal storage conditions prior to the use of the photosensitive sheet or film. Many of these known sensitizers contain a basic group, such as dimethylamino, which chemically reacts with the organic halogen compound, resulting in a reduction in or loss of photosensitivity, e.g. premature acid formation. Other known sensitizers, such as the cyanine dyes, are salts of strong acids and weak bases which, because of their acidity, will react with acid sensitive components in the photosensitive system during storage. Moreover, because dyes in salt form are generally insoluble in organic solvents, they are often difficult to formulate and coat. Many can be made only by complicated synthesis and are expensive to prepare and to purify. Leuco dye bases, besides being basic, are sensitive to oxygen and are therefore difficult to purify and to store. The yellow azo compounds are restricted in their absorption of light and in many cases do not effectively sensitize organic halogen compounds.

It is therefore an object of this invention to provide a novel sensitized photosensitive element having photolyzable organic halogen compounds.

Another object of this invention is to provide sensitized compositions containing photolyzable organic halogen compounds.

Still another object of this invention is to provide novel photosensitive copysheets and improved processes for their manufacture and use.

In accordance with this invention it has been found that photolyzable organic halogen compounds are sensitized to higher wavelengths of light in solution by one or more nonbasic propenone compounds. These sensitizers are desirably essentially unreactive with said organic halogen compounds in the dark under ambient conditions, i.e. they are stable for periods of at least 3 months, preferably at least 6 months, under ambient conditions in the dark. For example, they are most preferably free of alkylamino groups which react with organic halogen compounds in the absence of light.

The propenone compounds in this invention are ketones of the formula

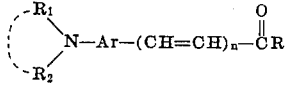

wherein $R_1$ and $R_2$ are either aromatic radicals e.g. phenyl, naphthyl, or other aryl radicals) or together form a 5 or 6 membered heterocyclic ring (e.g. carbazole, phenothiazine, phenoxazine), Ar is a divalent aromatic radical (preferably phenylene or biphenylene), n is 1 or 2, and R is an aromatic or heterocyclic radical. The various radicals comprising the propenone may be substituted or unsubstituted, provided the resulting compound is free of amine groups more basic than the diphenylamino radical. R is desirably free of electron withdrawing groups, such as nitro, azo, etc., but may contain releasing groups such as alkyl, aryl, ether, thioether, halogen, etc. or secondary aromatic amino groups. Propenones in which n=2 may be prepared from the Claisen condensation of p-diphenylaminocinnamaldehyde with ketones containing an adjacent methyl or methylene group. Propenones in which n=1 may be prepared from the base catalyzed Claisen condensation of p-diphenylaminobenzaldehyde with ketones having an adjacent methyl or methylene group to give a 1-substituted-3-(p-di-phenylaminophenyl)2-propene-1-one. The propenones are dyes containing no readily available unshared electrons and hence are stable in the presence of base sensitive materials. Such propeones are known in the literature, see Belgian Pat. No. 710,239.

Photolyzable organic halogen compounds capable of generating free radical halogen under the influence of light are known. Preferred photolyzable organic halogen compounds are nongaseous (i.e. solid or liquid) at room temperature and have a polarographic half wave reduction potential above about −0.9. Illustrative are hexabromoethane, tetrabromo-o-xylene, dibromotetrachloroethane, tribromotrichloroethane, pentabromo-ethane, dibromocyanoacetamide, tris-tribromomethyltriazine, dibromodibenzoylmethane, triiodomethane, tetrabromodifluoro-ethane, tribromoquinaldine, hexachloro-p-xylene, etc.

The enhanced sensitivity of the photolyzable organic halogen compounds is not restricted to any particular use, type of construction or imaging process. When coated onto a substrate with acrylate esters, the photoproduced free radicals cause free radical polymerization of the ethylenically unsaturated monomer. Tacky polymerized areas are made nontacky by toner powder development, revealing the image. The unpolymerized and unexposed areas may be transferred to plain paper and then powder developed to give a copy of the original light image. The unpolymerized monomer may also be transferred to a water receptive metal surface and then polymerized to produce a lithographic plate. In still another application the photoproduced acid is used to effect the bleaching of dyes, resulting in high resolution positive or nonreversal copies of transparent graphic originals.

The sensitized systems of this invention are also useful in conjunction with tetrahydropyranyl derivatives of aromatic hydroxy and amino compounds, the photoproduced acid causing decomposition of these derivatives to generate the parent hydroxy or amino compounds which are capable of reducing silver or other metal complexes to form visible images.

Photosensitive films incorporating organic halogen compounds which undergo photodecomposition may also be sensitized in accordance with this invention. Illustrative photosensitive films of this type are shown in U.S. Pat. No. 3,081,165, their use being described in xerographic image recording processes characterized as "electrochemography". In these processes an electrostatic latent image is formed by exposure of an electrochemographically sensitive surface or layer to yield a conductivity latent image adapted to produce an electrostatic latent image by selective dissipation of an electrostatic surface charge, either once or repetitively without the necessity for successive exposures to an optical image.

Although the concentration ratio of sensitizer to organic halogen compound is not critical, generally the molar ratio is between 1/20 to 2/1, respectively, for maximum speed. Coatings, layers, films or sheets made with solutions of these organic halogen compounds and sensitizers, normally with a binder, are unusually stable and can be stored for long periods under ordinary room conditions. The resulting constructions absorb light well into the visible light spectrum. These sensitizers are soluble in organic solvents such as acetone, ethyl ethyl ketone, monomethyl ether of ethylene glycol, etc. and are easily prepared and purified. Moreover, the high efficiency of these sensitizers makes it possible to use less expensive and nontoxic organic halogen compounds.

The following examples will illustrate the invention.

To a stirred solution of 37.5 g. (0.137 mol) of p-diphenylaminobenzaldehyde, prepared as described by Baker et al. in *J. Organic Chem.* 30, 3717 (1965), and 23.0 g. (0.153 mol) of p-methoxyacetophenone in 200 ml. 95 percent ethanol at 35° C. was added dropwise 15 ml. of a 50 percent aqueous potassium hydroxide solution (0.170 mol). After continuing the stirring overnight the bright yellow crystals were filtered off, washed with ethanol and air dried. 51.5 g. (92.5 percent yield) of crude product (m.p. 140–145° C.) was obtained. This product was taken up in hot benzene, treated with charcoal, filtered and diluted with half its volume of hexane and allowed to crystallize. The pure product (39.0 g., 70 percent yield) was 1-(p-methoxyphenyl)-3-(p-diphenylaminophynyl)-2-propen-1-one, m.p. 146–147° C.

Using the above general procedure the dyes of Table I were prepared.

TABLE I

| R | Melting point (° C.) | Maximum absorption in ethanol (A.) |
|---|---|---|
| —⟨phenyl⟩—N(phenyl)₂ | 110–112 | 425 |
| thiophene | 151–152 | 423 |
| —⟨phenyl⟩—SCH₃ | 148–149 | 420 |
| —⟨phenyl⟩—OCH₃ | 146–147 | 413 |
| anthracenyl | 217–218 | 412 |
| —⟨phenyl⟩(CH₃O)—OCH₃ | 132–134 | 405 |
| —⟨phenyl⟩(CH₃)(CH₃)—CH₃ | 149–150 | 402 |

The sensitizing dyes in table I were added to the following formulation and coatings were prepared on a polyester film base using a standard knife coating apparatus set at an orifice of 3.0 mils.

| | |
|---|---|
| 5 weight percent cellulose acetate butyrate in acetone | 3.0 grams |
| 1-(2-tetrahydropyranyloxy)-4-methoxy naphthalene | 0.02 gram |
| $C_2Br_2Cl_4$ | 0.01 gram |
| Sensitizing dye | 0.005 gram |

Samples of the dried coatings were exposed to tungsten light through a Corning glass filter that allowed light of wavelengths greater than 390 millimicrons to pass. After exposure, the exposed samples were placed in face to face contact with a receptor sheet containing a coating of

| | |
|---|---|
| Silver behenate | 12.6 parts by weight |
| Phthalazinone toner | 5.2 parts by weight |
| 2,6-di-t-butyl-4-methyl phenol | 2.2 parts be weight |
| Polyvinylbutyral binder | 19.8 parts by weight |
| Zinc oxide | 50.0 parts by weight |
| Polyterpene resin | 10.0 parts by weight | and then heated at 110° C., for about 10 seconds. The liberated 4-methoxy-11-naphthol caused selective reduction of the silver behenate in the exposed areas to give a dense black on white negative copy of the original.

Table II lists the exposure intensity required for each coating to obtain a silver image density on the receptor sheet of approximately 1.0, indicating the increase in sensitivity over the control sample with no sensitizing dye.

TABLE II

| Example | Dye | Exposure in foot-candle-seconds |
|---|---|---|
| Control | No dye (Control) | No image at 540,000. |
| 1 | (⟨phenyl⟩)₂—N—⟨phenyl⟩—CH=CHCO—⟨phenyl⟩—N(⟨phenyl⟩)₂ | 10,000. |
| 2 | (⟨phenyl⟩)₂—N—⟨phenyl⟩—CH=CHCO—⟨thiophene⟩ | 15,000. |
| 3 | (⟨phenyl⟩)₂—N—⟨phenyl⟩—CH=CHCO—⟨phenyl⟩—SCH₃ | 15,000. |
| 4 | (⟨phenyl⟩)₂—N—⟨phenyl⟩—CH=CHCO—⟨phenyl⟩—OCH₃ | 15,000. |
| 5 | (⟨phenyl⟩)₂—N—⟨phenyl⟩—CH=CHCO—⟨anthracenyl⟩ | 50,000. |
| 6 | (⟨phenyl⟩)₂—N—⟨phenyl⟩—CH=CHCO—⟨phenyl⟩(OCH₃)—OCH₃ | 40,000. |
| 7 | (⟨phenyl⟩)₂—N—⟨phenyl⟩—CH=CHCO—⟨phenyl⟩(CH₃)(CH₃)—CH₃ | 30,000. |

EXAMPLE 8

| | |
|---|---|
| Pentaerythritol tetraacrylate | 5.0 grams |
| Cellulose Acetate Butyrate (26% butyryl, 20.5% acetyl, 2.5% hydroxyl, melting point 215°–220° C.) | 1.75 grams |
| 1(p-methoxy)-3-(p-diphenylamino- -phenyl)-2-propen-1-one | 0.050 gram |
| 1,3,5-tris-(tribromomethyl)-s- triazine | 0.37 gram |
| Acetone | 50 ml. |

The above solution was prepared and coated 3.0 mils wet on 3 mil polyester in the dark. The dried, tacky coating was pressure laminated with one mil polyester, and exposed imagewise to 4000 foot candle seconds of tungsten illumination. The protective film was removed and the photopolymer sheet dusted with toner powder and fused at 150° C. to give a well defined positive image of the original.

EXAMPLE 9

| | |
|---|---|
| N-benzoyl-leucomethylene blue (prepared as described in U.S. Pat. No. 2,909,520) | 1.0 gram |
| Dibromotetrachloroethane | 1.0 gram |
| Cellulose Acetate Butyrate (26% butyryl, 20.5% acetyl, 2.5% hydroxyl, melting point 215°–220° C.) | 0.5 gram |
| 1-(p-methoxyphenyl)-3-(p-dimethyl- aminophenyl)2-propen-1-one | 0.01 gram |
| Acetone | 10 ml. |

The above solution was prepared and knife coated 1.0 mil thick on polyester film in the dark. Contact exposure through a negative 6 inches from a photo flood lamp for 10 seconds gave a well defined green negative image of the original, which could be rendered light insensitive by heated at 150° C. for 2 minutes to remove the halogen compound.

What is claimed is:

1. In a photosensitive composition containing a photolyzable organic halogen compound having a polarographic half wave reduction potential above about −0.9, at least one sensitizer comprising a nonbasic propenone of the formula

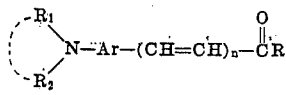

wherein $R_1$ and $R_2$ are either aromatic radicals or together form a 5- or 6-membered heterocyclic ring, n is one or two, R is an aromatic or heterocyclic radical free of electron withdrawing groups, and Ar is a divalent aromatic radical, said nonbasic propenone being free of amino groups more basic than the diphenylamino radical and being essentially unreactive with said organic halogen compound in the dark under ambient conditions.

2. The photosensitive composition of claim in which said photolyzable organic halogen compounds are normally nongaseous compounds.

3. A photosensitive layer containing the photosensitive composition of claim 1.

4. The photosensitive composition of claim 1 in which said composition is capable of a chemical change in the presence of either free radical halogen or acid.

5. The photosensitive composition of claim 1 in which said composition contains a photopolymerizable monomer.

6. The photosensitive composition of claim 1 in which said composition contains a compound which is capable of changing color in acid environment.

7. The photosensitive composition of claim 1 in which the molar ratio of said sensitizer to said organic halogen compound is from 1/20 to 2/1.

8. An image recording element which contains at least one layer comprising the photosensitive composition of claim 1.

* * * * *

UNITED STATES PATENT OFFICE
CERTIFICATE OF CORRECTION

Patent No. 3,617,288                     Dated November 2, 1971

Inventor(s) Richard B. Hartman and George H. Smith

It is certified that error appears in the above-identified patent and that said Letters Patent are hereby corrected as shown below:

Column 2, line 74, "ethyl" should be --methyl--;

Column 4, line 38, "4-methoxy-11-naphthol" should be --4-methoxy-1-naphthol--;

Column 5, line 7, "1(p-methoxy)-" should be --1(p-methoxyphenyl)- --.

Signed and sealed this 22nd day of May 1973.

(SEAL)
Attest:

EDWARD M. FLETCHER, JR.
Attesting Officer

ROBERT GOTTSCHALK
Commissioner of Patents